(12) United States Patent
Smith et al.

(10) Patent No.: US 10,723,329 B2
(45) Date of Patent: Jul. 28, 2020

(54) UNIVERSAL TRAILER MOUNTED PROPORTIONAL BRAKE CONTROLLER

(71) Applicant: Cequent Performance Products, Inc., Plymouth, MI (US)

(72) Inventors: Bruce Edward Smith, Leo, IN (US); Mark William Austin, Coldwater, MI (US); Richard Lyons Hilsbos, Plainville, MI (US); Chandrakumar Kulkarni, Battle Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 516 days.

(21) Appl. No.: 14/874,918

(22) Filed: Oct. 5, 2015

(65) Prior Publication Data

US 2016/0023642 A1 Jan. 28, 2016

Related U.S. Application Data

(63) Continuation of application No. 12/625,987, filed on Nov. 25, 2009, now Pat. No. 9,150,201.

(60) Provisional application No. 61/200,205, filed on Nov. 25, 2008.

(51) Int. Cl.
*B60T 7/00* (2006.01)
*B60T 7/08* (2006.01)
*B60T 7/20* (2006.01)
*B60T 8/17* (2006.01)

(52) U.S. Cl.
CPC ............. *B60T 7/085* (2013.01); *B60T 7/20* (2013.01); *B60T 8/1708* (2013.01)

(58) Field of Classification Search
CPC ........................................................ B60T 7/00
See application file for complete search history.

(56) References Cited

U.S. PATENT DOCUMENTS

| 4,856,850 A | * | 8/1989 | Aichele | B60T 13/662 303/20 |
|---|---|---|---|---|
| 5,016,898 A | | 5/1991 | Works | |
| 5,242,215 A | * | 9/1993 | Krause | B60T 13/683 303/15 |
| 5,615,930 A | * | 4/1997 | McGrath | B60T 7/20 303/124 |

(Continued)

OTHER PUBLICATIONS

Service Manual 440-1002 for Carlisle Electric Brake Actuator Kit; Carlisle Industrial Brake and Friction; pp. 1-8; Bloomington, IN.

*Primary Examiner* — Jonathan M Dager
(74) *Attorney, Agent, or Firm* — McDonald Hopkins LLC

(57) ABSTRACT

A trailer mounted proportional brake controller for a towed vehicle and a method of controlling the brakes of a towed vehicle is described. The brake control unit may control the brakes of a towed vehicle. The brake control unit may include a power control unit and a hand control unit. The power control unit may be connected to the brakes of the towed vehicle and the power control unit may be capable of selectively controlling the brakes of the towed vehicle based on a set of braking parameters. The hand control unit may be configured to remotely communicate with the power control unit. The hand control unit may be capable of transmitting information to the power control unit to adjust at least one of the braking parameters and receiving information from the power control unit.

16 Claims, 7 Drawing Sheets

(56) References Cited

U.S. PATENT DOCUMENTS

| | | | |
|---|---|---|---|
| 5,738,363 A | 4/1998 | Larkin | |
| 5,741,048 A * | 4/1998 | Eccleston | B60T 7/20 303/20 |
| 5,893,575 A | 4/1999 | Larkin | |
| 6,012,780 A * | 1/2000 | Duvernay | B60T 7/20 188/112 R |
| 6,039,410 A * | 3/2000 | Robertson | B60T 7/20 188/3 R |
| 6,068,352 A * | 5/2000 | Kulkarni | B60T 7/20 303/124 |
| 6,179,390 B1 * | 1/2001 | Guzorek | B60T 7/042 188/3 R |
| 6,282,480 B1 * | 8/2001 | Morse | B60T 17/18 303/124 |
| 6,364,432 B1 | 4/2002 | Mixon | |
| 6,371,572 B1 | 4/2002 | Frank | |
| 6,499,814 B1 | 12/2002 | Mixon | |
| 6,520,528 B2 | 2/2003 | Fandrich et al. | |
| 6,557,952 B1 * | 5/2003 | Robertson | B60T 7/16 303/122.08 |
| 6,619,759 B2 * | 9/2003 | Bradsen | B60T 7/20 188/206 R |
| 6,652,038 B1 * | 11/2003 | Frye | B60T 7/20 303/7 |
| 6,655,752 B2 * | 12/2003 | Robertson | B60T 8/1708 303/124 |
| 6,685,281 B2 | 2/2004 | MacGregor et al. | |
| 6,752,474 B1 * | 6/2004 | Olberding | B60T 7/20 188/112 R |
| 6,802,572 B2 | 10/2004 | Lamke et al. | |
| 6,837,551 B2 | 1/2005 | Robinson et al. | |
| 6,845,851 B1 * | 1/2005 | Donaldson | B60T 7/16 188/3 H |
| 6,891,468 B2 * | 5/2005 | Koenigsberg | B60T 8/885 303/20 |
| 6,966,613 B2 | 11/2005 | Davis | |
| 7,021,723 B1 * | 4/2006 | Kaufman | B60T 7/16 303/20 |
| 7,058,499 B2 * | 6/2006 | Kissel | B60T 8/1708 303/138 |
| 7,273,260 B2 * | 9/2007 | Gray | B60T 7/20 188/3 R |
| 7,311,364 B2 | 12/2007 | Robertson | |
| 7,347,507 B1 * | 3/2008 | Stillinger | B60T 7/20 303/20 |
| D584,695 S * | 1/2009 | Hilsbos | D13/168 |
| D598,395 S | 8/2009 | Hilsbos et al. | |
| 7,575,286 B2 | 8/2009 | Robertson | |
| 8,145,402 B2 * | 3/2012 | Craig | B60W 30/00 701/80 |
| 8,165,768 B2 * | 4/2012 | Leschuk | B60T 7/12 303/123 |
| 8,180,546 B2 * | 5/2012 | Culbert | B60T 7/20 303/7 |
| 8,543,278 B2 * | 9/2013 | Risse | 340/5.54 |
| 8,571,777 B2 * | 10/2013 | Greene | B60D 1/30 701/70 |
| 8,700,285 B2 * | 4/2014 | Barlsen | B60Q 1/305 340/431 |
| 8,909,426 B2 * | 12/2014 | Rhode | B62D 1/22 701/41 |
| 9,073,524 B2 * | 7/2015 | Cusi | B60T 8/1708 |
| 9,315,173 B1 * | 4/2016 | Gray | B60T 7/20 |
| 2001/0038239 A1 | 11/2001 | Ehrlich et al. | |
| 2002/0038974 A1 * | 4/2002 | Lamke | B60T 11/108 303/7 |
| 2002/0123837 A1 * | 9/2002 | Eccleston | B60T 7/20 701/70 |
| 2002/0180257 A1 * | 12/2002 | Gill | B60T 8/323 303/7 |
| 2003/0038534 A1 * | 2/2003 | Barnett | B60T 8/1708 303/7 |
| 2003/0168908 A1 * | 9/2003 | Robinson | B60T 7/10 303/7 |
| 2005/0077780 A1 * | 4/2005 | Robertson | B60T 7/20 303/7 |
| 2005/0127747 A1 * | 6/2005 | Robertson | B60T 7/20 303/20 |
| 2006/0076827 A1 * | 4/2006 | Albright | B60T 7/20 303/123 |
| 2006/0097569 A1 | 5/2006 | Eberling | |
| 2006/0176166 A1 * | 8/2006 | Smith | B60L 3/00 340/479 |
| 2006/0214506 A1 * | 9/2006 | Albright | B60T 7/20 303/123 |
| 2007/0114836 A1 * | 5/2007 | Kaminski | B60T 7/06 303/7 |
| 2007/0222283 A1 | 9/2007 | Skinner | |
| 2008/0309156 A1 * | 12/2008 | Kissel | B60T 7/20 303/20 |
| 2010/0152920 A1 * | 6/2010 | McCann | B60T 7/20 701/2 |

\* cited by examiner

UNIVERSAL TRAILER MOUNTED PROPORTIONAL BRAKE CONTROLLER

CROSS-REFERENCE TO RELATED APPLICATION

This application is a continuation of U.S. patent application Ser. No. 12/625,987, entitled "Universal Trailer Mounted Proportional Brake Controller," filed Nov. 25, 2009, which claims benefit from U.S. Provisional Patent Application No. 61/200,205, entitled "Universal Trailer Mounted Proportional Brake Controller," filed on Nov. 25, 2008, which are both hereby incorporated in their entirety by reference.

FIELD OF THE INVENTION

The present invention relates generally to a brake controller and, more particularly, to a brake controller for a towed vehicle.

BACKGROUND

A variety of brake controllers may be employed to control the brakes of a towed vehicle. Typically, the brake controller of a towed vehicle may actuate the towed vehicle's brakes in response to braking by the towing vehicle. These brake controllers may often include accelerometers and microprocessors which may measure and/or take into account a variety of conditions (e.g., braking signal, acceleration, etc.), whereby the brake controller may apply the towed vehicle's brakes in such a manner that assists in stopping the towing vehicle and towed vehicle, and may also reduce the likelihood of skidding, jack-knifing, swaying and the like.

The towed vehicle's brake controller is often mounted to the towing vehicle. Typically, the brake controller may be hard-wired to the towing vehicle, such as being mounted in the cab or passenger compartment of the towing vehicle. The brake controller may communicate with the brake system of the towed vehicle by means of a wiring system that may provide communication between the towing vehicle's brake system and the towed vehicle's brake system.

Hard wiring the brake controller to the towing vehicle is often time consuming and expensive. In addition, some vehicles are not manufactured with the appropriate wiring necessary for a towed vehicle's brake controller, and thus, require aftermarket installation of such wiring, which is time consuming and expensive. Moreover, mounting the brake controller in the cab or passenger compartment of the towing vehicle may frequently require mechanically fastening, such as with screws, bolts, etc., the brake controller to the dash or other interior surface or component of the vehicle, thereby resulting in permanent damage to the dash or other interior component of the towing vehicle.

In some instances, the brake controller may be programmed by a user to take into account variables, such as vehicle weight, road conditions, and other parameters that may potentially affect braking effectiveness. Current brake controllers may not be operable to receive instructions from a user located in the towing vehicle when the towing and towed vehicles are in use and in motion.

In addition, some brake controllers may be required to be mounted directly to the towed vehicle, which precludes them from any adjustments when the towing vehicle is in motion. Moreover, it may be desirable to be able to program the brake controller during vehicle motion as this programming may provide for diagnostics and more accurate input, such as maximum brake output power and the like.

Therefore, there is a need in the art for an improved brake controller that may be used with various trailer braking means, such as electronic or hydraulic brakes, that allows the user to make adjustments to the brake controller while the vehicle is in motion. The brake controller is also not required to be hard wired to a towing vehicle whereby the operator may quickly change between different towing vehicles and while still using the same trailer. In addition, the power control unit of the brake controller may be mounted in any fixed location and is independent of direction of travel.

SUMMARY

A trailer mounted proportional brake controller for a towed vehicle is described. The brake control unit may control the brakes of a towed vehicle. The brake control unit may include a power control unit and a hand control unit. The power control unit may be connected to the brakes of the towed vehicle and the power control unit may be capable of selectively controlling the brakes of the towed vehicle based on a set of braking parameters. The hand control unit may be configured to remotely communicate with the power control unit. The hand control unit may be capable of transmitting information to the power control unit to adjust at least one of the braking parameters.

In addition, the power control unit may be capable of controlling the brakes. The hand control unit may be remotely connected to the power control unit. The hand control unit may include a display. The hand control unit may be capable of receiving information regarding the status of the brakes from the power control unit. the display of the hand control unit may be capable of displaying information from the power control unit, such as diagnostics, connectivity, status, brake output voltage, and the like.

A method of controlling the brakes of a towed vehicle is described. The method may include inputting information, transmitting information and adjusting and controlling the brakes of the towed vehicle based on that information. Information may be inputted into a hand control unit. That information may be remotely transmitted from the hand control unit to a power control unit. At least one of a set of braking parameters may be adjusted in the power control unit based on that information. The brakes may be controlled based on the braking parameters.

DESCRIPTION OF THE DRAWINGS

Objects and advantages, together with the operation of the invention, may be better understood by reference to the following detailed description taken in connection with the following illustrations, wherein like numerals indicate like elements throughout, and wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A trailer mounted proportional brake controller ("brake controller") 10 is shown in FIGS. 1-9. The brake controller 10 may be an electronic control device that may provide braking power to brakes on a towed vehicle (not shown) that may be proportional to the level of braking effort supplied by the towing vehicle (not shown). The brake controller 10 may generally include a hand control unit 20 and a power control unit 50.

Figure 8:
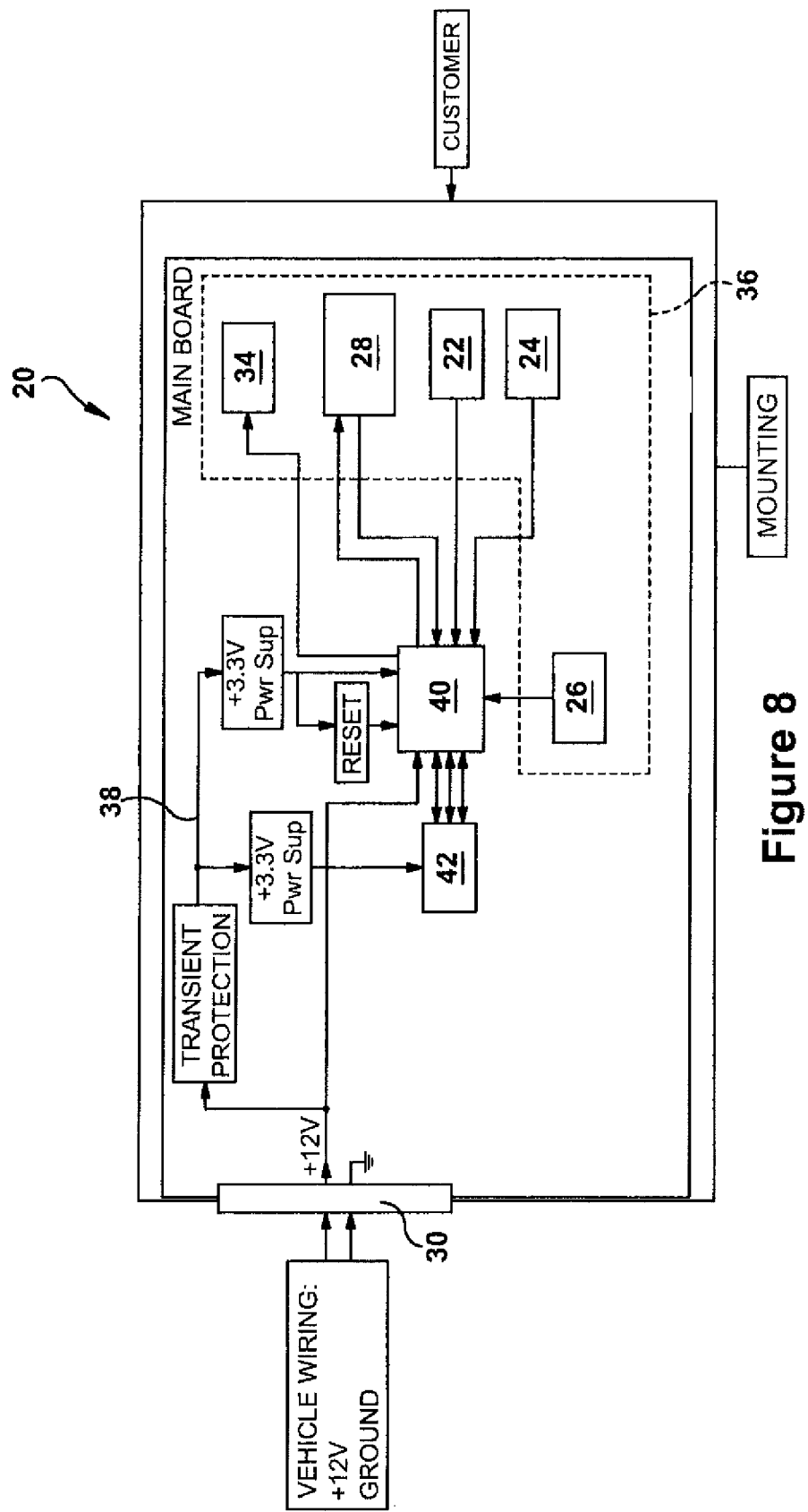
FIG. 8 illustrates an electrical block diagram of the hand control unit of FIG. 1.
Figure 9:
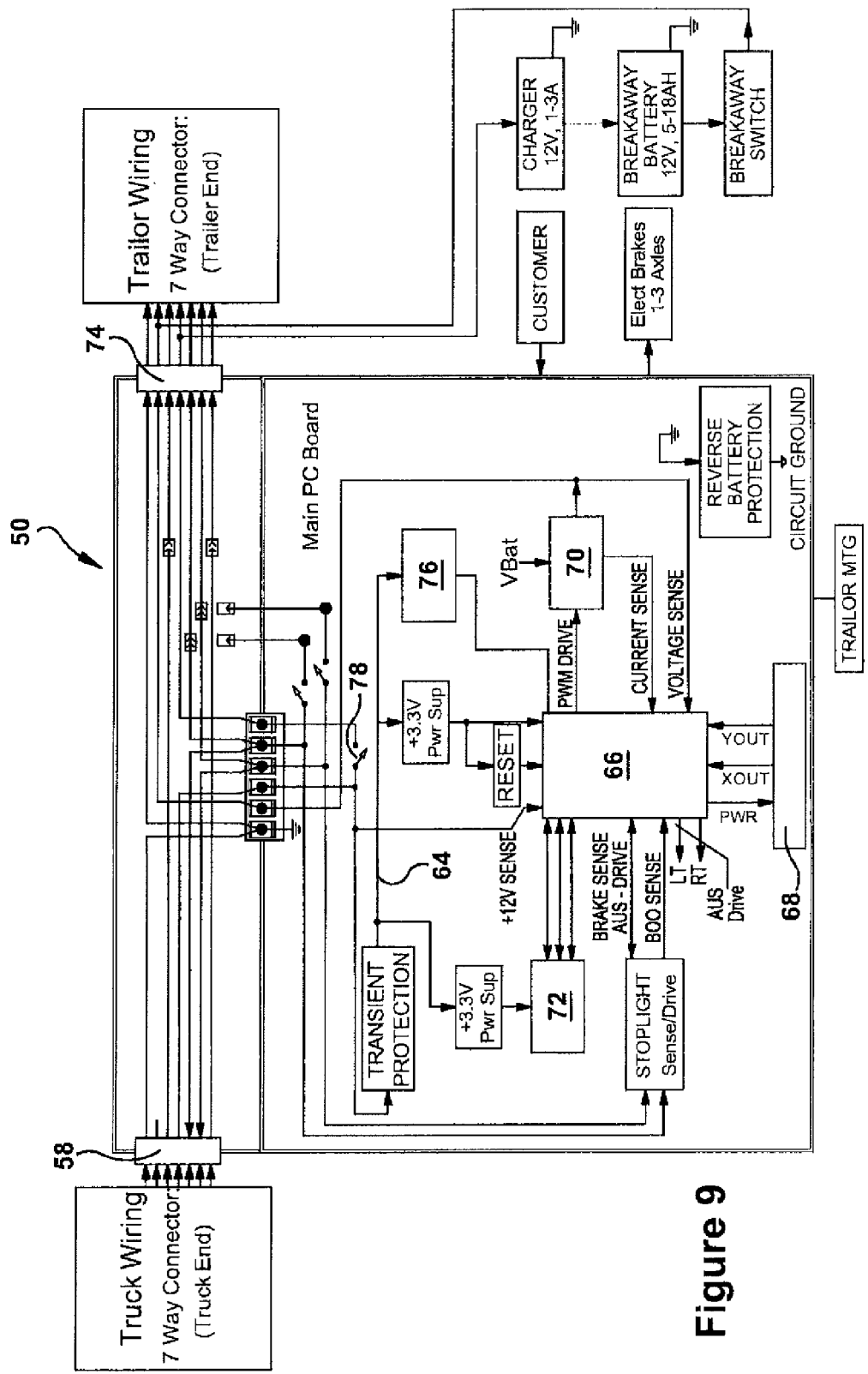
FIG. 9 illustrates an electrical block diagram of the power control unit of FIG. 1.

The hand control unit 20 and power control unit 50 may communicate with one another via a Radio Frequency (RF) link. For example, each unit 20, 50 may include a RF module 42, 72 respectively (FIGS. 8 and 9). The hand control unit 20 may be operable to receive user input for various brake control parameters and communicate that user input to the power control unit 50. The power control unit 50 may be operable to actuate a towed vehicle's brakes in accordance with the brake control parameters inputted by the user into the hand control unit 20. It is to be understood, however, that the power control unit 50 may operate independently from the hand control unit 20.

The power control unit 50 may be operable to transmit data from braking and other events to the hand control unit 20. In turn, the hand control unit 20 may display, or otherwise communicate, feedback from such an event to the user for review, whereby the user may then adjust one or more brake control parameters or make any other necessary and/or desirable adjustments based on that feedback. Advantageously, the RF communication between the hand control unit 20 and the power control unit 50 may allow the brake controller 10 to operate without being hard-wired to the towing vehicle's brake system.

The hand control unit 20 may be of any appropriate shape or size, such as a generally rectangular, triangular or circular shape. For example, the hand control unit 20 may generally be an easily movable type of remote. The hand control unit 20 may be located at any appropriate location, such as within the towing vehicle's cab or passenger compartment and within the user's reach, whereby the user may easily input instructions and receive feedback from the hand control unit 20.

The hand control unit 20 may include a body 18 and one or more user operable controls or user interface devices 36. The user interface devices 36 may receive instructions from a user and may display data or system information for review by the user. The interface devices 36 may include a power or gain wheel 22, a boost button 24 and a manual or control knob 26 for receiving instructions from the user, as well as a display screen 28 and a loudspeaker 34 for providing feedback to the user, such as settings, outputs and faults (FIGS. 1-3 and 8).

The hand control unit 20 may also include a power supply circuit 38, a microprocessor 40, and an RF module 42 for communicating with the power control unit 50 (FIG. 8). As used herein, the term "microprocessor" may include a general-purpose processor, a microcontroller (e.g., an execution unit with memory, etc., integrated within an integrated circuit), a digital signal processor (DSP), a programmable logic device (PLD) or an application specific integrated circuit (ASIC), among any other appropriate type of processing devices.

While the brake controller 10 is shown and described herein as utilizing an RF module to communicate between the hand control unit 20 and the power control unit 50, it is to be understood that any other appropriate type of communication may be utilized, such as a wired communication link between the two units 20, 50, and should not be limited to that disclosed herein.

The microprocessor 40 may be operable to receive, process and transmit information to and from the user interface devices 36 as well as the RF module 42 (FIG. 8). The RF module 42 may transmit instructions from the hand control unit microprocessor 40 to the RF module 72 of the power control unit 50, as well as receive feedback and other data from the RF module 72 of the power control unit 50 whereby the data is then forwarded to the microprocessor 40 for further processing.

The gain wheel 22 may be operable to allow the user to set the maximum braking force supplied (i.e., maximum brake output voltage) to the towed vehicle's brakes by the power control unit 50. The gain wheel 22 may be of any appropriate type, such as a rotary or wheel-type potentiometer. It will be understood, however, that any input device that allows the user to increase or decrease the gain setting may be employed. For example, a linear-travel potentiometer, digitally controlled potentiometer, touch portions on a display screen, displacement transducer, alphanumeric keyboard, or the like may be used. The microprocessor 40 may receive, store and transmit the gain control settings from the user's adjustment of the wheel 22 to the power control module 50 via a communications link between the respective RF modules 42, 72.

The manual control or knob 26 of the hand control unit 10 may be operable to actuate the towed vehicle's brakes when the user moves the knob 26 from a rest position. This may allow the user to manually apply the towed vehicle's brakes without having to depress the towing vehicle's brake pedal. The manual knob 26 may be of any appropriate type, such as a spring-loaded, linear-travel potentiometer, whereby the further the knob 26 is moved from the rest position, the greater the braking force (i.e., brake output voltage) applied by the towed vehicle's brakes.

While the manual knob 26 may be a spring-loaded, linear-travel potentiometer, it will be understood that any appropriate type of input device that allows the user to manually apply and vary the braking force of the towed vehicle's brakes may be employed. For example, a rotary potentiometer, digitally controlled potentiometer, touch portions on a display screen, displacement transducer, alphanumeric keyboard, and the like may be used. The microprocessor 40 may receive, store and transmit the manual control settings from the user adjustment of the knob 26 to the power control module 50 via a communications link between the respective RF modules 42, 72.

The manual knob 26 may provide an increasing brake output voltage from the brake controller 10 as the manual knob 26 is moved from the at rest position. Activation of the manual knob 26 may also immediately wake up the hand control unit 20, turn the display on, and indicate trailer connectivity when the trailer is connected or not connected.

When the manual knob 26 is used simultaneously with the automatic mode during a braking event, the function that produces the greater brake output voltage will become dominant. The manual control input to the brake controller 10 may allow the operator to manually apply trailer brakes without having to depress the brake pedal. By holding the manual knob 26 at maximum, the user may adjust the desired maximum power by adjusting the gain wheel 22.

In terms of its effect on the braking voltage, the manual knob 26 may have a range from 0.0 volts minimum to a maximum voltage set by the gain wheel 22. The hand control unit's 20 microprocessor 40 may learn the mechanical travel limits of the manual knob 26 and store these values. These values may be used to set the minimum and maximum limits of travel for the manual software algorithm. The hand control unit's 20 microprocessor 40 may supply both the power supply and ground reference to the manual knob 26 potentiometer. When the manual knob 26 is activated, it may cause a flashing display message to become stationary while the manual knob 26 is held on.

The gain wheel 22 may allow the operator to increase or decrease the maximum braking force supplied to the trailer brakes. The user may use both the gain wheel 22 and the manual knob 26 to set the maximum braking force applied during a full braking event. For example, the towed vehicle's brakes may be fully applied with the manual knob 26 while simultaneously setting the maximum brake output voltage with the gain wheel 22. The maximum brake output voltage may be limited by the gain wheel 22 adjustment setting. This gain set point may allow the operator to limit the towed vehicle's wheel skidding during a braking event. In addition, if the brake pedal is depressed while the manual knob 26 is also actuated, the function that produces the greater output voltage at the power control unit 50 will be used.

During either manual or automatic operation, power adjustment may immediately change the maximum output voltage that may be applied to the electric brake magnets. For a given fixed gain wheel 22 setting, the output from a full manual control application should be the substantially the same as the full output from the deceleration determined by the accelerometer 68. The gain wheel 22 may be interfaced via an analog input directly connected to the microprocessor 40 in the hand control unit 20. The hand control unit's 20 microprocessor 40 may supply both the power supply and ground reference to the gain wheel 22 potentiometer.

The hand control unit 20 may be equipped with a display 28. The display 28 may be of any appropriate shape, size or type, such as a generally rectangular, square or circular shaped, two character, seven segment LED display 28. System feedback and operator input, such as trailer connection, output voltage, and diagnostic information may be displayed on the hand control unit's 20 display 28. The gain wheel 22 setting and relative trailer braking power during a braking event may be provided to the operator through the hand control unit's 20 display 28. Additional information, including system diagnostics may be shown on the display 28.

For example, a two-digit LED display 28 may be used. It will be appreciated, however, that any variety of display screens may be employed, including but not limited to LCD, vacuum fluorescent, touch-screen and the like. In addition, the user's gain and/or boost setting may be displayed on the screen 28. The display screen 28 may also indicate that the respective RF modules 42, 72 of the hand control unit 20 and power control unit 50 are in communication with one another.

The hand control unit 20 may also be equipped with a loud speaker 34. The display screen 28 and loudspeaker 34 may be operable to provide feedback to the user. The feedback provided to the user via the display screen 28 and/or loudspeaker 34 may include any appropriate type of information, such as verification of user input, information received from the power control unit 50, and the like. For example, the display screen 28 may display the actual brake output voltage during a braking event.

In addition, the display screen 28 and/or loudspeaker 34 may also notify or warn the user of certain fault conditions whereby the display screen 28 shows an alphanumeric code corresponding with a specific fault condition which may also be accompanied by a beep, tone or series of beeps and/or tones annunciated by the loudspeaker 34. For example, some fault conditions with alphanumeric codes may include:

"NC" for no connectivity or loss of connectivity between the towing and towed vehicle;

"SH" for a short circuit in the towed vehicle's electric brake circuit or a shorted electric brake magnet;

"OL" for an electrical overload or an exceeding of a pre-defined brake output current during a braking event;

"OG" for an open ground sensed on the power control unit.

It is to be understood that other fault conditions and corresponding alphanumeric codes may also be displayed and/or annunciated and those described herein are for illustrative purposes only. As an alternative, the display screen 28 may describe the fault condition in full text and/or employ a voice module to enunciate the detection of certain fault conditions.

A boost button 24 may be provided to permit adjustment of how quickly the trailer brakes respond to the application of the towing vehicles brakes. The boost button 24 may be a separate button that may increment or change the boost setting in the brake controller 10. The boost button 24 of the hand control unit 20 may be operable to allow the user to set the initial brake output voltage of the power control unit 50.

The boost button 24 may allow the user to change deceleration parameters based on the towed vehicle's size, weight, and road conditions. Typically, the requisite amount of boost may be proportional to the weight of the towed vehicle. For example, the larger and heavier the towed vehicle, the greater the boost setting employed. Various boost levels or settings may be pre-programmed into the microprocessor 40 whereby the boost button 24 may be employed to cycle through the various boost settings until the user finds the boost setting of choice. Alternatively, a user may manually input the desired boost setting.

In normal automatic operation, the brake controller 10 may ramp up the output voltage from zero to the voltage set by the gain wheel 22 setting, in proportion to the horizontal deceleration sensed by the accelerometer 68. The output voltage may be determined based on current boost settings and any applied algorithms. The necessary deceleration required to reach the maximum power setting may be reduced for each level of boost.

The microprocessor 40 may receive, store and transmit the boost control settings from the user to the power control module 50 via a link between the respective RF modules 42,

72. While the brake controller 10 may employ the boost button 24, it will be understood that any appropriate type of input device that allows a user to either cycle through various pre-programmed boost settings and/or manually input an initial brake output voltage may be employed. For example, rotary potentiometer, linear-travel potentiometer, digitally controlled potentiometer, touch portions on a display screen, displacement transducer, alphanumeric keyboard, and the like.

While the brake controller 10 may be shown and described as being used with certain user interface devices 36 and associated inputs, it is to be understood that any appropriate number of types of interface devices and inputs may be used and should not be limited to those disclosed herein. The hand control unit 20 may be operable to receive and transmit other instructions and data from a user. For example, other user inputs may include: vehicle speed, ABS input, road conditions, towed vehicle weight, towing vehicle weight, and the like.

No mounting holes are needed in the driver's compartment or cab of the towing vehicle to use the hand control unit 20. The hand control unit 20 may be held in place on the dash with a dash pad (not shown). The hand control unit 20 may also be placed in a recessed tray or cup holder built into the vehicle's interior. The hand control unit 20 may be powered by the towing vehicle's electrical system. For example, the hand control unit 20 may include a power cord 30.

The power cord 30 may connected to an auxiliary power port connecter 32. The auxiliary power port connector 32 may be plugged into one of the vehicle's accessory or cigarette lighter outlets and provides electrical power to the power supply circuit 38. However, it will be understood that the hand control unit 20 may be powered through a variety of any other appropriate means, such as by a battery, solar power, and the like. The hand control unit 20 may also employ an energy conservation mode whereby after a certain period of inactivity, the microprocessor 50 may shut down certain portions of the unit's circuitry to conserve energy. The hand control unit 20 may be easily removed from the auxiliary power port, such as a cigarette lighter, and stored when not towing or in use.

Figure 1:
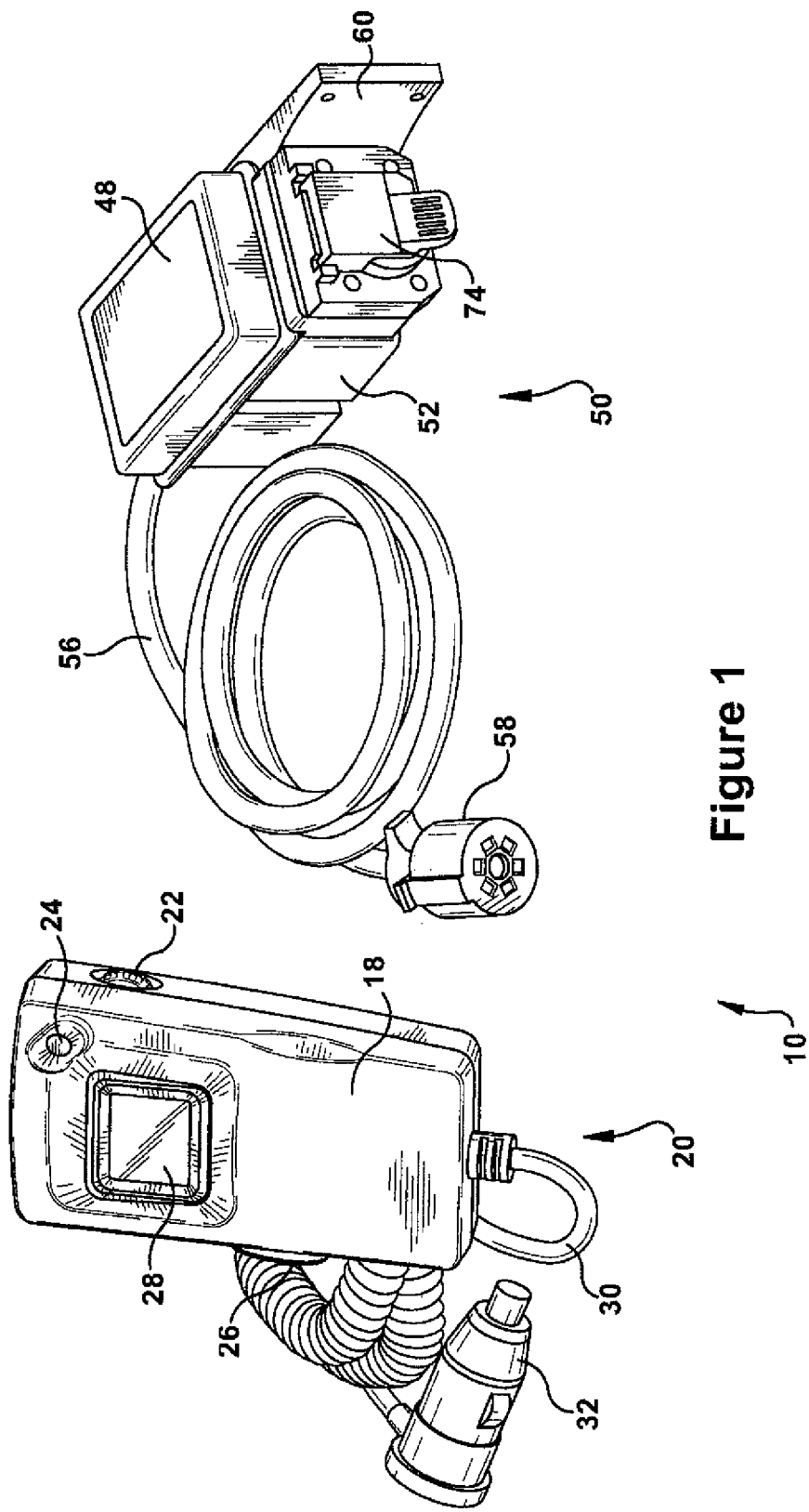
FIG. 1 illustrates a perspective view of a brake controller.
Figure 3:
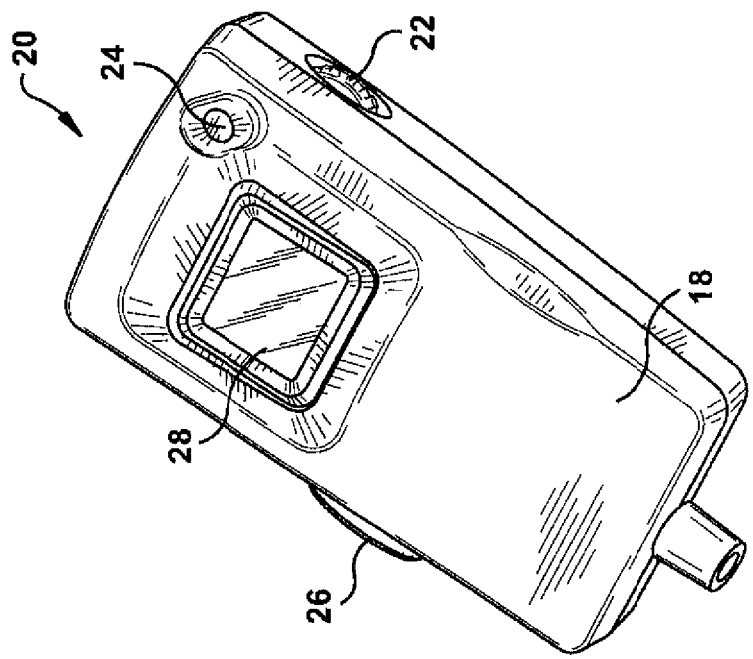
FIG. 3 illustrates another perspective view of the hand control unit of the brake controller.
Figure 2:
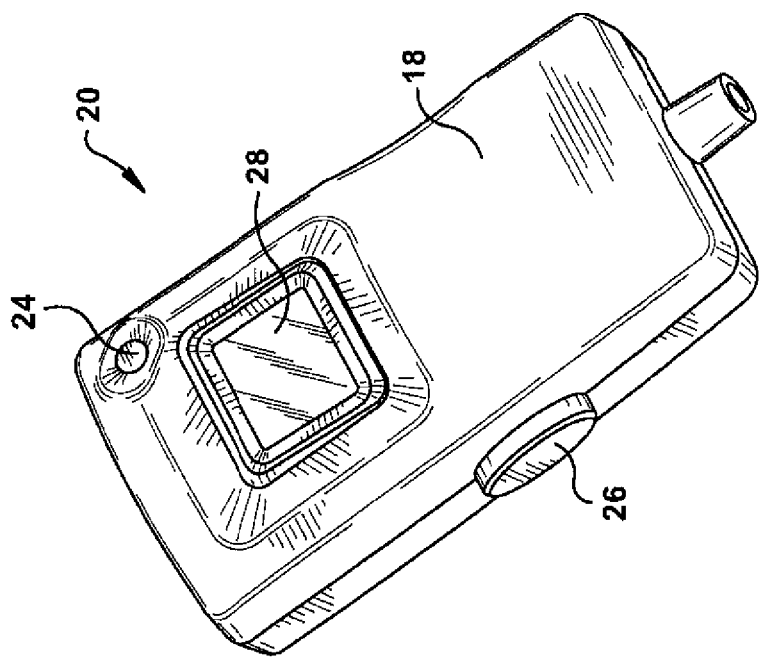
FIG. 2 illustrates a perspective view of a hand control unit of the brake controller.
Figure 4:
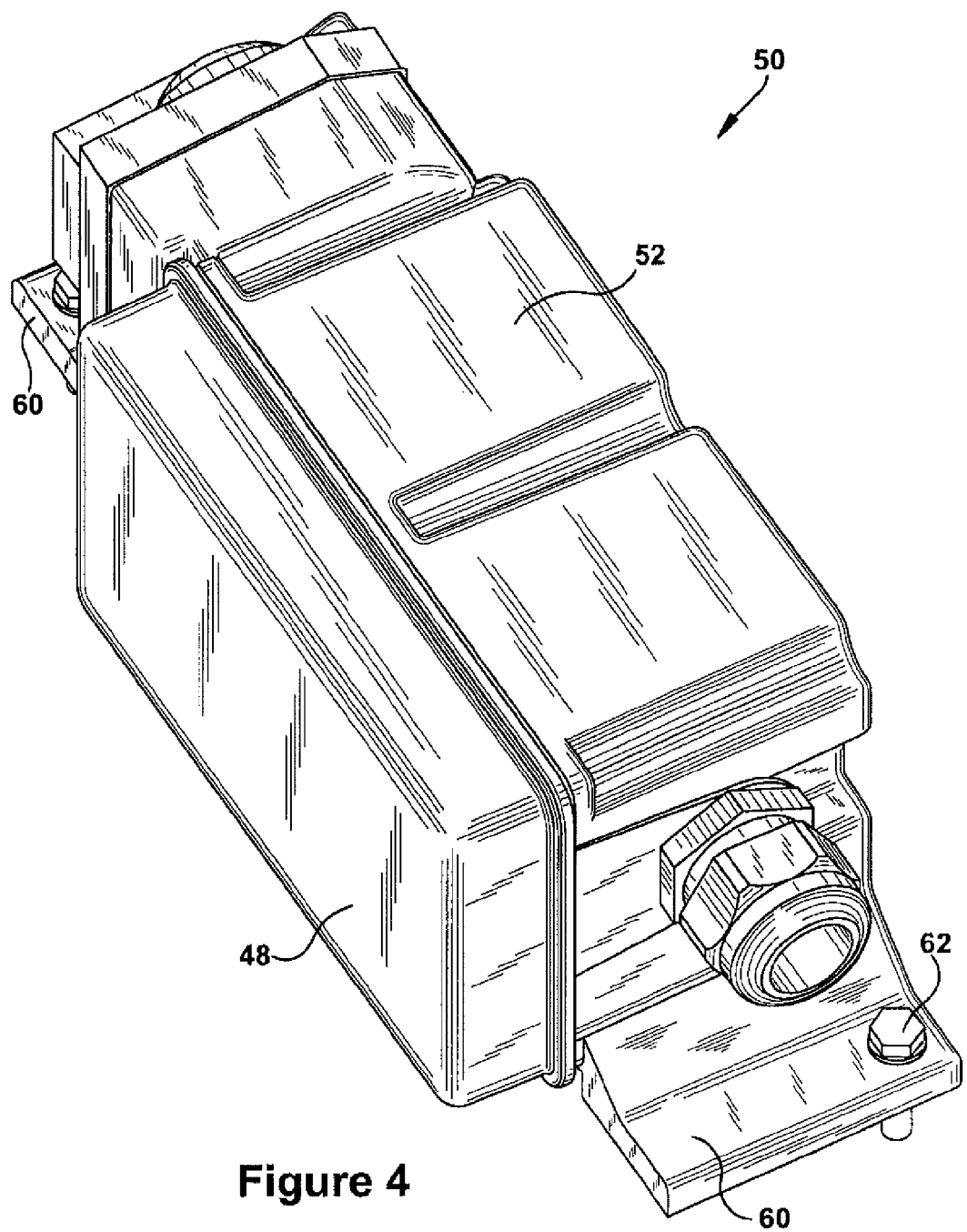
FIG. 4 illustrates a perspective view of a power control unit of the brake controller.
Figure 5:
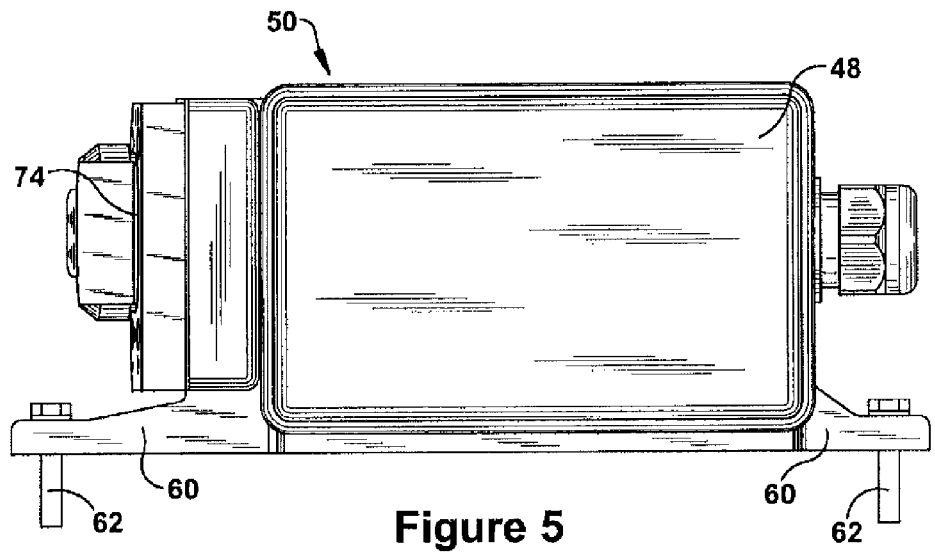
FIG. 5 illustrates a top view of the power control unit of the brake controller.
Figure 6:
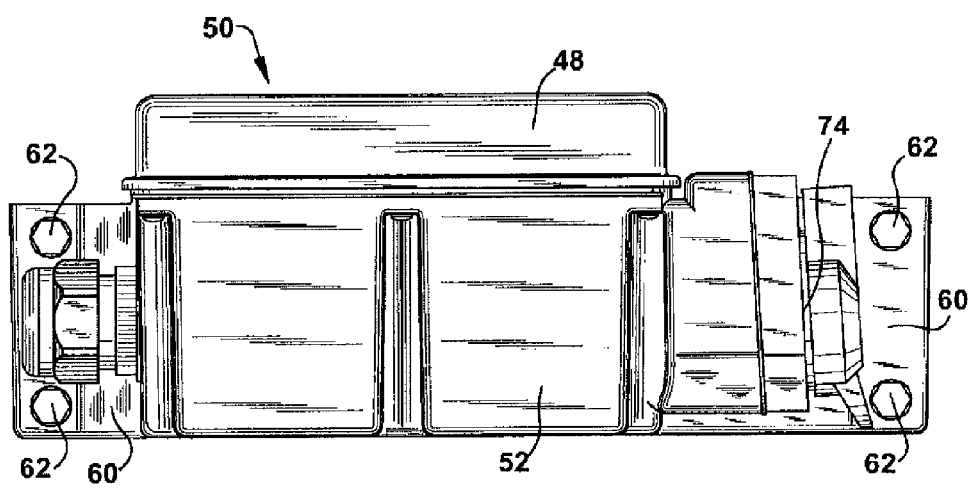
FIG. 6 illustrates a front view of the power control unit of the brake controller.
Figure 7:
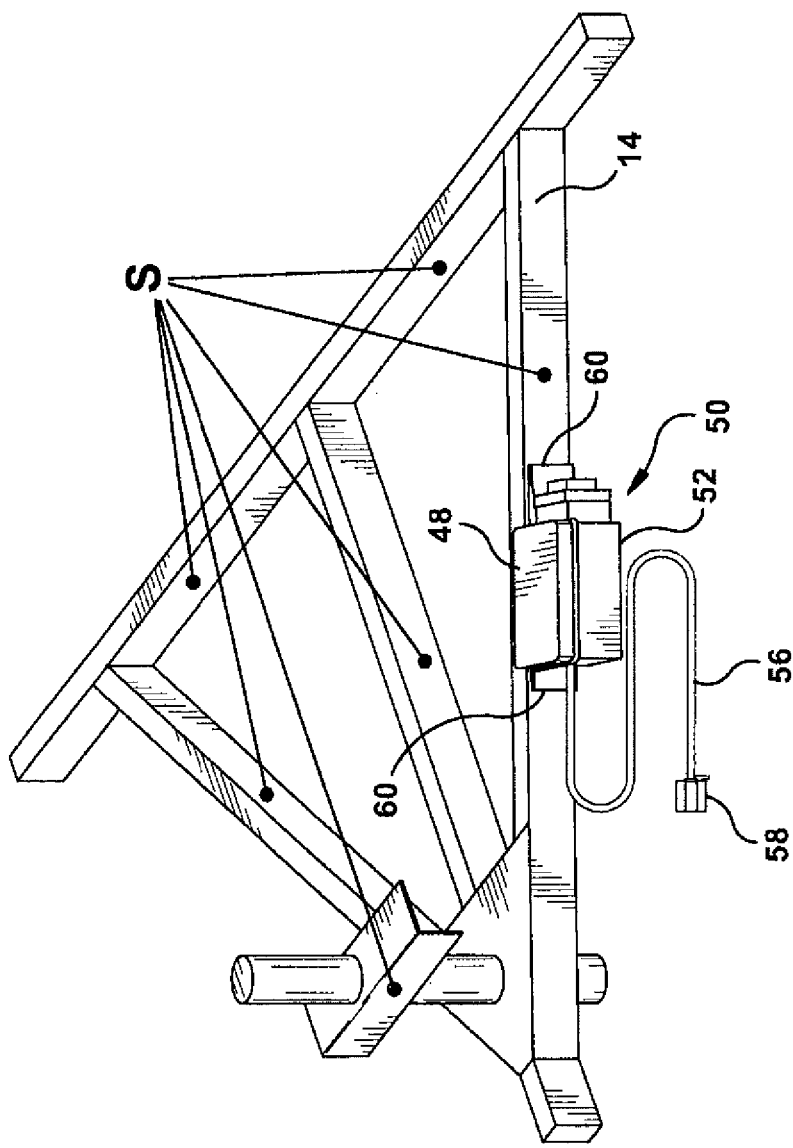
FIG. 7 illustrates a perspective, environmental view of the power control unit of the brake controller.

The power control unit 50 may include a cover 48, a body 52, a power supply circuit 64, a microprocessor 66, an accelerometer 68, one or more power output devices 70, and an RF module 72 for communicating with the hand control unit 20 (FIGS. 1, 4-7 and 9). In addition, the power control unit 50 may include a receptacle 74 for receiving a seven-way cable of the towed vehicle, as well as a its own seven-way cable 56 that connects directly to a corresponding seven-way receptacle 58 of the towing vehicle (FIGS. 1 and 7).

The power control unit 50 may be attached to the frame 14 of the towed vehicle by any appropriate means, such as with fasteners, welding or the like. For example, the power control unit 50 may include at least one mounting flange or bracket 60. The power control unit 50 may be secured to the trailer frame 14 by the mounting brackets 60 and fasteners 62, such as screws, bolts, nuts or the like (FIGS. 5-7). The power control unit 50 may be mounted to any suitable surface S on the trailer frame 14 (FIG. 7). The power control unit 50 may be mounted in any direction relative to direction of travel. The cover 48 of the power control unit 50 should be located above the trailer frame 14 rail.

The power control unit 50 may include a cable 56 that may plug into a receptacle (not shown) of the towing vehicle. The cable 56 may be of any appropriate shape, size or type, such as a 7-way cable 56 (FIGS. 1, 5 and 6). When all connections are made, this connection may supply all power and signals to both the power control unit 50 and to the towed vehicle or trailer. No additional wiring on the trailer is necessary.

The power control unit 50 may receive electrical power to power the power supply circuit 64, as well as brake, tail light, and turn signal information from the towing vehicle. However, it will be readily appreciated that the power control unit 50 and towing vehicle may be electrically connected by any suitable cable/pin configuration, including but not limited to four-pin, five-pin, six-pin, etc. The power control unit 50 may typically be mounted to the frame 14 of a towed vehicle such that the power control unit 50 may be in series between the towing vehicle and the towed vehicle. Additionally, the power control unit 50 may also include indicators, such as a display or one or more LED's 76, to display status or for diagnostic purposes.

The RF module 72 of the power control unit 50 may be operable to receive instructions from the RF module 42 of the hand control unit 20, as well as transmit feedback, diagnostics, drive input and other data from the power control unit 50 to the RF module 42 of the hand control unit 20, whereby that information from the power control unit 50 may be viewed on the display 28 of the hand control unit 20. Additional data may also be transmitted by the RF module 72, including but not limited to towed battery voltage, towed vehicle wheel speed, sway, brake temperature, tire pressure, etc.

The accelerometer 68 of the power control unit 50 may be operable to measure deceleration of the towed vehicle during a breaking event. The microprocessor 66 may employ this deceleration data in a software algorithm to control the towed vehicle's brakes. The accelerometer 68 may be of any appropriate type of accelerometer, such as an Analog Devices™ ADXL213AE accelerometer, a low-cost +/−1.26 g dual axis accelerometer, or any other suitable single, dual or three-axis accelerometer. Through the use of the accelerometer 68, the brake controller 10 may determine the towing vehicle's rate of deceleration and then apply the trailer brakes to match. The proportional brake controller 10 delivers power to the trailer brakes in direct relationship to the actual physical deceleration of the towing vehicle.

The accelerometer 68 of the power control unit 50 may be soldered directly to the PC Board. Brake controllers may typically use a solid state accelerometer have typically used a separate daughter board that is mounted perpendicularly or at 90 degrees to the motherboard. This provides for the optimum mounting angle for a 2-axis accelerometer. The power control unit 50 may be mounted in the direction of travel, such that the X-axis and Y-axis may be measured and processed for deceleration. The power control unit 50 may be mounted in any appropriate direction or angle.

Two-axis accelerometers may be required to be mounted flat to the horizon. As an alternative, the accelerometer may be mounted in the vertical in the direction of travel. Two-axis accelerometers mounted in the horizontal plane rather than the vertical plane must be mounted in accordance with a "this end up" sticker or something similar to indicate the appropriate direction. A two-axis accelerometer may sense deceleration with respect to the horizon instead of a fixed forward direction and may require the user to install the brake control unit as specified with the correct end pointing upwards.

The microprocessor 66 of the power control unit 50 may be operable to receive and process information transmitted through the towed vehicle's seven-way cable 56 (e.g., right and left turn and stop signals, etc.), as well as receive, process and transmit information to and from the RF module 72, the accelerometer 68 and power output device 70. The microprocessor 66 may be of any appropriate type of microprocessor, such as a Freescale™ C9S08AW32 microprocessor.

During a braking event, the microprocessor 66 may detect the initiation of the braking event by receiving, decoding and processing braking information from the towing vehicle via the aforementioned seven-way connections. The microprocessor 66 may then use the brake control parameters inputted by the user in conjunction with deceleration data measured by the accelerometer 68 in a software algorithm to calculate the deceleration rate of the combined towing and towed vehicles to generate a Pulse Width Modulated (PWM) brake output voltage, which may be supplied to the power output devices 70.

Accordingly, these power output devices 70, in turn, may actuate the towed vehicle's brakes. The towed vehicle may have any appropriate type of brakes, such as electric brakes, electric-over-hydraulic brakes, or the like. Typically, the greater the combined deceleration rate calculated by the microprocessor 66, the greater the PWM brake output voltage supplied to the power output devices 70 and greater the braking force applied by the towed vehicle's brakes.

The brake controller 10 may determine the occurrence of a braking event by processing signals from the left and right stop and turn indicator wires. The power control unit 50 may then supply power to the trailer brakes proportional to the deceleration rate. The braking energy provided to the trailer's brakes may be varied in proportion to the rate of deceleration with a Pulse Width Modulated (PWM) signal that may adjust the output between nominally 0 Volts and available battery voltage. The higher the duty cycle, the greater the braking power available. An algorithm programmed into the brake controller 10 may determine the PWM output signal communicated to the brake magnets on the trailer, based on brake activation signals and deceleration information from the accelerometer 68. The brake controller 10 may also use operator selected settings sent from the hand control unit 20 to modify the signal communicated to the trailer brakes.

In addition, the microprocessor 66 may also record data from a braking event, as well as monitor for certain fault conditions, and transmit such data and/or fault condition error codes to the hand control unit 20 via the communications link between the respective RF modules 42, 72. The power control unit 50 may also employ an energy conservation mode whereby after a certain amount of inactivity, the microprocessor 66 will shut down certain portions of the unit's circuitry to conserve power.

The power control unit 50 may include a relay 78 (FIG. 9). The relay 78 may protect the towing vehicle's power supply system. The current may be measured through the relay 78 contacts. If the measured current exceeds a predetermined value, the relay 78 may open for a specific period of time to protect the towing vehicle's power supply due to additional current being drawn by the towed vehicle's braking and other electrical systems. The relay 78 may close after such period of time to re-establish the connection with the towing vehicle's power supply system.

The brake controller 10 may operate with reduced performance if the hand control unit 20 is removed or disconnected while the trailer is in use. The brake controller 10 may hold the trailer within a reduced level of the maximum power setting while the operator is at a standstill, such as 25%, with the brake pedal applied for longer than a predetermined time, such as 5-7 seconds. The brake controller 10 may brake proportionally in reverse. The brake controller 10 may apply the appropriate brake voltage based on deceleration.

To conserve power, the brake controller 10 may enter a sleep mode two hours after there has been no movement or braking activity on the power control unit 50 or the hand control unit 20. Pressing the brake pedal in the tow vehicle or connecting/disconnecting the trailer from the power control unit 50 may wake up both the power control unit 50 and hand control unit 20. The hand control unit 20 may wake up by any activation of the manual knob 26, gain wheel 22 or boost button 24. However, if the power control unit 50 does not have power or is disconnected, the hand control unit 20 may indicated it is not connected and then return to the sleep mode.

Wireless communication between the hand control unit 20 and power control unit 50 eliminates the need for under dash wiring. The brake controller 10 may provide for continual diagnostic scanning with a visual warning in the hand display 28 should a fault condition occur. Power saving mode reduces drain on battery when vehicle is not in use.

The brake controller 10 may also include a reverse mode. Pressing the boost button 24 for five seconds while the brake pedal is pressed may turn off the boost and ramp for a period of three minutes or until the boost button 24 is pressed without the brake pedal. The purpose of the reverse mode is to keep the trailer brakes from coming on due to boost or ramp while backing up and/or riding the brake. The trailer brakes may only be applied during reverse deceleration or manual operation. Upon release from reverse mode, the boost may return to the previous level.

The brake controller 10 may be installed by any appropriate means or method. For example, the brake controller 10 may be installed as follows: the hand control unit 30 may be plugged into a 12V power port in the driver's compartment; the power control unit 50 may be mounted to the trailer frame 14 with fasteners; the 7-way cable of the power control unit 50 may be plugged into the towing vehicle's 7-way connector; the hand control unit 20 may be paired with the power control unit 50 to complete the RF link; the 7-way cable of the trailer may be plugged into the power control unit 50; and then the vehicles may be test driven to adjust the power (gain) control on the hand control unit 20 to adjust the brake control's output to the towed vehicle weight.

The hand control unit 20 may be paired to the power control unit 50 by any appropriate means or method. For example, the hand control unit 20 may be pre-paired or synchronized to the power control unit 50 prior to purchase or the hand control unit 20 may be individually paired to the power control unit 50.

The brake controller 10 may be self-leveling or may automatically acquire the proper level setting of the tow vehicle and trailer combination during the pairing operation. Upon a successful pairing, the trailer mount power module may store the measured acceleration due to gravity and zero out the learning of the forward direction for acceleration, which may be re-learned based on subsequent stops.

The power control unit 50 may use a standard blade style 7-way truck and trailer connectors. The power control unit 50 may be watertight and include a sealed eight foot 7-way cable 56. The power control unit 50 may be powered through the 7-way cable 56 from the towing vehicle. While the brake controller 10 is shown and described herein as utilized a 7-way connection on the power control unit 50, it is to be understood that the power control unit 50 may utilized any appropriate type of connection, such as a 4-way, 13-pin, and the like, and should not be limited to that disclosed herein. In addition, the power control unit 50 may be hard wired directly from the trailer to the towing vehicle.

The invention has been described above and, obviously, modifications and alterations will occur to others upon a reading and understanding of this specification. The claims as follows are intended to include all modifications and alterations insofar as they come within the scope of the claims or the equivalent thereof.

Having thus described the invention, we claim:

1. A brake controller comprising:
   a power control unit capable of controlling brakes of a towed vehicle, wherein said power control unit comprises an acceletometer;
   a wireless hand control unit remotely connected to said power control unit;
   wherein said hand control unit is: i) powered by one of a towing vehicle's auxiliary power, a battery, and solar power; ii) capable of receiving information regarding status of said brakes from said power control unit; and iii) includes a display screen that displays said information from said power control unit; and
   wherein said power control unit is powered by the towing vehicle via a rear receptacle on the towing vehicle.

2. The brake control unit of claim 1, wherein said information includes the status of said brakes including diagnostics and fault conditions related to said power control unit.

3. The brake control unit of claim 1, wherein said power control unit includes a cover and is capable of being mounted in any direction on said towed vehicle whereby said cover is in an upwards direction.

4. The brake control unit of claim 1, wherein said hand control unit is configured to receive power from a vehicle's auxiliary power port.

5. The brake control unit of claim 1, wherein said hand control unit is capable of wireless communicated with said power control unit.

6. A brake controller comprising:
   a power control unit operatively coupled with brakes of a towed vehicle, said power control unit controlling said brakes, said power control unit having an accelerometer located on said towed vehicle;
   a hand control unit remotely connected to said power control unit;
   wherein said hand control unit receives information regarding status of said brakes from said power control unit; and
   wherein said hand control unit includes a display displaying said information from said power control unit.

7. The brake control unit of claim 6, wherein said status of said brakes includes diagnostics and fault conditions related to said power control unit.

8. The brake control unit of claim 6, wherein said power control unit includes a cover and is mounted in any direction on said towed vehicle whereby said cover is in a generally upwards direction.

9. The brake control unit of claim 6, wherein said hand control unit receives power from a vehicle's auxiliary power port.

10. The brake control unit of claim 6, wherein said hand control unit transmits information to said power control unit.

11. The brake control unit of claim 10, wherein said hand control unit transmits information to said power control unit to adjust at least one of said braking parameters, and wherein said information transmitted from said hand control unit to said power control unit includes a brake control parameter signal.

12. The brake controller of claim 11, wherein said power control unit selectively applies a voltage to said brakes.

13. The brake controller of claim 12, wherein said hand control unit adjusts said voltage applied to said brakes.

14. The brake controller of claim 11, wherein said braking parameters include gain to control maximum braking force.

15. The brake controller of claim 14, wherein said gain is adjustable by said hand controller.

16. The brake controller of claim 6, wherein said hand control unit communicates with said power control unit by way of Radio Frequency (RF) communication.

* * * * *